No. 868,657. PATENTED OCT. 22, 1907.
A. HAAS.
WATER ELEVATOR.
APPLICATION FILED AUG. 23, 1906.

2 SHEETS—SHEET 1.

WITNESSES
Edward Thorpe
J. Fred Acker

INVENTOR
Albert Haas
BY Munn & Co
ATTORNEYS.

No. 868,657. PATENTED OCT. 22, 1907.
A. HAAS.
WATER ELEVATOR.
APPLICATION FILED AUG. 23, 1906.

2 SHEETS—SHEET 2.

WITNESSES
Edward Thorpe

INVENTOR
Albert Haas
BY Munn & Co
ATTORNEYS

UNITED STATES PATENT OFFICE.

ALBERT HAAS, OF NEW YORK, N. Y.

WATER-ELEVATOR.

No. 868,657.　　　　　Specification of Letters Patent.　　　　　Patented Oct. 22, 1907.

Application filed August 23, 1906. Serial No. 331,730.

*To all whom it may concern:*

Be it known that I, ALBERT HAAS, a citizen of the United States, and a resident of the city of New York, borough of Manhattan, in the county and State of New York, have invented a new and Improved Water-Elevator, of which the following is a full, clear, and exact description.

My invention relates to water elevators or pumps especially adapted for use in connection with wind mills in the various branches of the farming industry, particularly in the work of irrigation from wells, and the purpose of the invention is to obtain greater efficiency together with a reduction in the cost of the plant and the cost of working the same, not obtainable in any pump of the same character of which I have knowledge.

Another purpose of the invention is to provide a pump or water elevator for wind mills which will be simple and durable in construction, readily and economically installed, and which is not liable to get out of order, and wherein the motion is purely a rotary one and wherein there is a total avoidance of the jerking and pulling motions so destructive in most ordinary pumps, resulting in loss of momentum and power, and wherein also on account of the rotary motion of the elevator it can be run at the highest speed considered safe for the wind mill operating it, enabling all possible advantage to be taken of strong winds.

It is also a purpose of the invention to obtain a minimum of friction and proportionate greater return of power.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1:
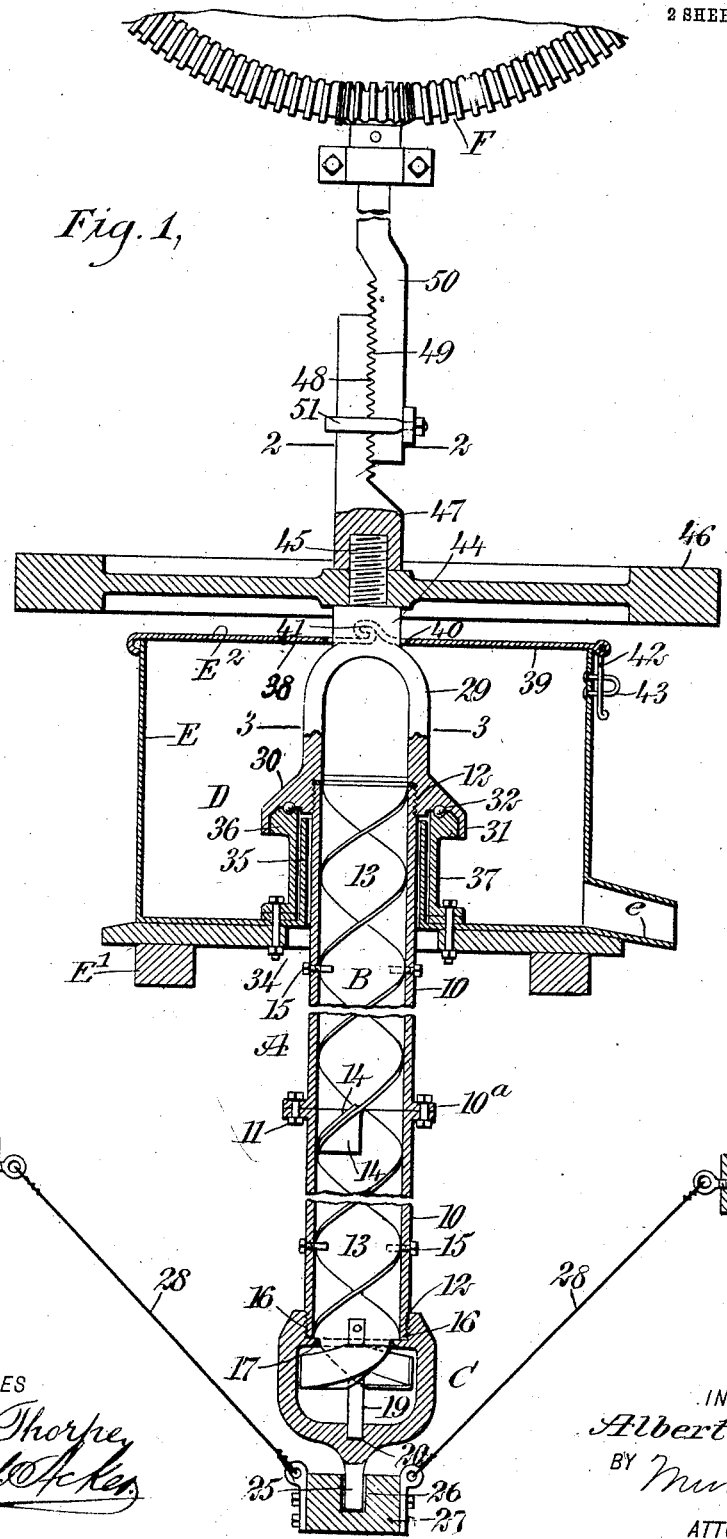
Figure 2:
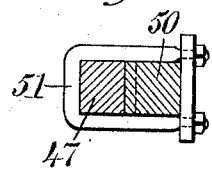
Figure 3:
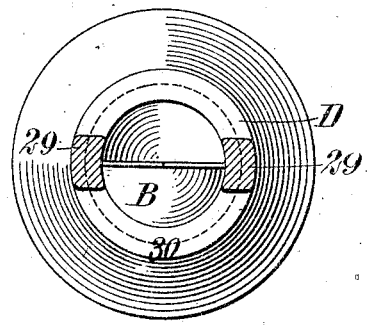
Figure 4:
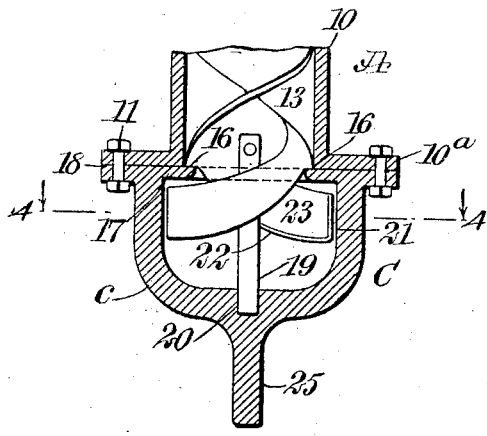
Figure 4:
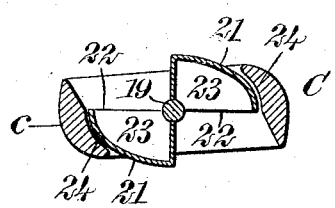

Figure 1 is a vertical section through the improved device; Fig. 2 is a horizontal section taken practically on the line 2—2 of Fig. 1; Fig. 3 is a horizontal section taken substantially on the line 3—3 of Fig. 1; Fig. 4 is a horizontal section taken substantially on the line 4—4 of Fig. 5; and Fig. 5 is a longitudinal central section through the upper and lower portions of the body of the device, illustrating a slight modification in the construction when the device is of more than ordinary dimensions.

Figure 5:
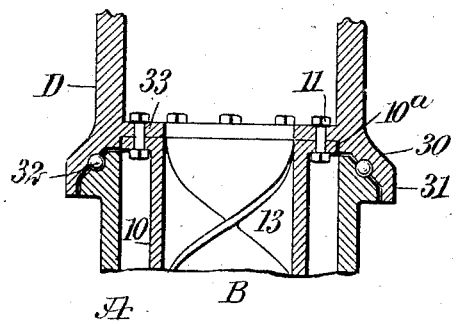

The body A of the device consists of one or more sections 10 of pipe of uniform diameter vertically disposed and preferably connected by providing the abutting ends of the sections with flanges 10ª, which are fastened together by bolts 11 having suitable nuts, or by the use of equivalents for the bolts; but except where the sections 10 are of unusually large diameter, as shown in Fig. 5, the outer ends of the upper and lower sections of the body are threaded as is shown at 12 in Fig. 1, for a purpose to be hereinafter described.

The tubular sections of the body A inclose throughout a double spiral water-elevation screw B, constructed in sections 13, which correspond in length to the length of the body sections 10. The sections 13 of the double spiral screw elevating device are connected where they abut usually by splitting the sections at such points and causing them to interlock in a smooth manner as is shown at 14 in Fig. 1; but equivalent means for effecting a smooth connection may be substituted.

The double spiral screw elevating device B is without a central driving shaft, and on that account may be manufactured very simply from strips of ductile sheet metal twisted to the desired pitch. The screw elevating device B is loosely fitted in the pipe section 10 of the body A, and is held from turning by passing screws 15 through said pipe sections, the inner ends of which screws are smooth, as shown in Fig. 1; and said smooth inner ends of the screws 15 are made to bear against that side of the blades of the spiral opposite to the direction in which said screw elevating device is to turn.

Upon an exact line with the lower end of the lower tubular section 10 of the body A, the double spiral elevating device B is somewhat narrowed at its outer edges, forming shoulders 16, which rest upon an annular flange 17 formed within a U-shaped bearing terminal C for the body A, which flange is at or near the top of said bearing terminal, being at the top when the lower tubular body section 10 has a flange connection 18 with said bearing terminal, as is shown in Fig. 5, and near the top when said lower body section 10 is screwed into the said bearing terminal, as is illustrated in Fig. 1; and such an engagement between the flange 17 and the shoulders 16 serves to prevent the spiral elevating device B from dropping down from its position in the body tube as is clearly shown in both Figs. 1 and 5.

The double spiral elevating device B extends down into the bearing terminal C, and the pivot pin 19 is centrally secured to its lower end in any approved manner. The said pin is mounted to rest in a socket 20, made in the lower central portion of the bearing terminal C, as is shown in Figs. 1 and 5. The lower ends of the blades of the double spiral elevating device B are widened below the shoulders 16 and extend into the bearing terminal C at the initial curvature of about ninety degrees, again assuming their normal width; and after such curvature said terminals are widened still more and gradually lose their pitch until at their lower extremities they extend practically horizontally in opposite directions as shown in Figs. 1, 4 and 5. The said lower ends of the blades of the elevating device B are provided with practically vertical members 21 at their outer side edges, providing opposing open receiving faces 22, as is particularly shown in Fig. 4. The said members 21 are added to the blades of the spiral in order to prevent centrifugal force from driving the water over the outer edges of said elevating device and insuring the water ascending the same. Thus a double scoop 23 is formed at the lower terminal of said elevating device, the water entering the latter through the opposing open sides of the bearing terminal C, as is shown in Fig. 4. The scoops 23 are aided in their action by the two arms c of the bearing terminal C, the inner sides of which are provided with curved recesses 24 corresponding to the curvature of the side members 21 of the scoops, whereby to cut the water and drive it sidewise inward into the path of the scoops.

The bearing terminal C terminates in the central bearing pin 25 which fits loosely in a socket 26 produced in a preferably suspended block 27, which latter is conveniently fastened by a wire 28, cable or its equivalent to the sides of a well or other receptacle for water in which the body A is introduced. The purpose of the block 27 and its fastenings is to prevent the possibility of extreme oscillation when the water in the elevating device B is being run at high speed.

The body A and its attachments are entirely supported from the upper terminal member D, which consists of an upper U-shaped section 29, a ring base 30 and a flange 31 that extends downward from the base; and in the bottom surface of said base a groove is produced, adapted to receive ball bearings 32 as is shown in Figs. 1 and 5.

In the smaller type of the device shown in Fig. 1, the upper end of the tubular body A is screwed into the base section of the upper terminal D; whereas in the larger type of the device, illustrated in Fig. 5, said upper terminal member D is provided with an interior flange 33, to which the flange 10ª of the upper body section is secured in the manner heretofore described.

A tank E receives the water delivered from the elevating device B, the said tank having an opening 34 in its bottom, preferably surrounded by an upwardly-extending guard flange 35; and the upper end of the tubular body A extends through the said opening and within said flange, as is shown in Fig. 1. The upper terminal D is mounted to revolve upon the upper enlarged surface 36 of a tubular bearing 37 bolted to the bottom of the tank E and its support E', which latter may be of any desired type. The flange 31 of the upper terminal D extends down over the exterior of the flanged surface 36 of the said tubular bearing 37, and said flanged surface 36 is provided with a groove to receive the ball bearings 32 as is illustrated in Figs. 1 and 5.

The tank E is provided with a delivery spout e and a cover E², made in two sections 38 and 39 having a central opening 40 and a loose lap seam connection 41 as is shown in Fig. 1; and one section of the cover is provided with a hasp 42 that receives a staple 43 secured to said tank. Thus it will be observed that the cover E² can be removed in sections, which is necessary since a shaft 44 extends from the upper terminal D out through the opening 40 in the cover, and said shaft is provided with an upper reduced threaded section 45 that carries a fly wheel 46; and further, said threaded section 45 of the shaft 44 is screwed into a second shaft 47 whose upper portion is polygonal in cross section, and is provided upon one face with teeth 48, which teeth engage teeth 49 on a third shaft 50, driven from the gearing F operated by the wind mill. The two shafts 47 and 50 turn as one shaft and yet are adjustably connected by a clip 51 of any desired type, as is shown in Fig. 2.

Among the advantages of the device which may be named is that the spiral being double the spiral passages are only about twice as high as they are wide, and since the spirals extend through the full length of the pipe there is no heavy column of water above the spiral, which column of water, were it present, on account of its pressure would require an appreciable item of greater power to be raised, but instead of this the momentum is imparted and maintained throughout the length of the spiral and pipe. The double spiral is also calculated to be of such pitch as to give the greatest possible return for the power expended. It may also be mentioned that the flanges of the upper terminal member D serve to protect the ball bearings from the water and thus keep said bearings from rusting.

It will be observed that no special foundation is required for the pump, thus rendering its installment very economical, and that ready access is had to the very bottom of the device, since the pump rests upon a suspended base and is wholly supported from above.

Having thus described my invention, I claim as new, and desire to secure by Letters Patent,—

1. In a water elevator, a suspended bearing, a tubular body, a terminal for the upper end of the body mounted to rotate, a bearing terminal for the lower end of the body, the said bearing terminal terminating in a bearing pin, fitting loosely in a socket in said suspended bearing, and a water elevating device held in said tubular body.

2. In a water elevator, a tubular body, a double spiral elevating device held within said body, a terminal for the upper end of the body mounted to rotate, and a bearing terminal for the lower end thereof, said spiral elevating device terminating at its lower end in scoops located in said bearing terminal.

3. In a water elevator, a tubular body, a double spiral water elevating device extending the length of said body, a terminal member for the upper end of said body, a support on which said terminal member is mounted to rotate, a bearing terminal for the lower end of the body, a post secured to the lower end portion of the said bearing terminal, said post being mounted to turn in a lower bearing, and opposing oppositely-facing scoops constituting the lower terminal for the water elevating device, which scoops are located within said bearing terminal for the lower end of the body.

4. In a water elevator, a tank, a tubular body, extending through and mounted to turn in said tank, a support on which the upper end of the tubular body is mounted to turn, a bearing terminal for the lower end of the said body, a double spiral water elevating device extending the length of the said tubular body, said water elevating device terminating at its lower end in opposing oppositely-faced scoops located in said bearing terminal, and means for holding the double spiral water elevating device from turning in said tubular body and from sliding therefrom.

5. In a water elevator, a tank, a tubular body extending through and mounted to turn in said tank, a support on which the upper part of the tubular body is mounted to turn, a bearing terminal for the lower end of the said body, a double spiral water elevating device extending the length of the said tubular body, said water elevating device terminating at its lower end in opposing oppositely-faced scoops located in said bearing terminal, means for holding the double spiral water elevating device from turning in said tubular body and from sliding therefrom, a suspended device in which the bearing terminal is pivoted, a shaft extending from the upper part of the body, and means for connecting said shaft with a mechanism driven by a wind mill.

6. In a water elevator, a tank, a suspended bearing below the tank, a tubular body extending through and mounted to turn in the tank, a bearing terminal for the said body, mounted to revolve in the said suspended bearing, the bearing terminal being provided with open side surfaces, an upper terminal for the said body, mounted to revolve in the said tank, roller bearings for said upper terminal of the body, a double spiral extending the length of the said body, which spiral at its lower end terminates in opposing oppositely-facing scoops located within the said bearing terminal, means for holding the said double spiral against turning in and slipping from said tubular body, and means for rotating the upper terminal for said body.

7. In a water elevator, the combination with a tank having an opening therein, a tubular bearing around said opening having a ball race in its upper surface, a tubular body constructed in connected sections, an open terminal for the upper end of said body, mounted to turn on said tubular bearing in engagement with the rollers carried thereby, a shaft connected with said upper terminal, constructed in adjustable sections, means for turning said shaft, a double spiral water elevating device constructed in sections of equal length to the sections of the body and extending from end to end of the body, a bearing terminal for the lower end of the body, open at opposite sides, a suspended bearing in which said bearing terminal is pivoted, scoop terminals for the lower end of the double spiral water elevating device, which scoops face in opposite directions, a pivotal support for the lower end of said water elevating device, and means for holding the said device against turning in or slipping from the said tubular body.

8. In a water elevator, a tubular body, a terminal for the upper end of the body mounted to rotate, a bearing terminal for the lower end of said body, a double spiral water elevating device in said tubular body, said water elevating device terminating at its lower end in scoops located in said bearing terminal, and means for holding the water elevating device from turning in said tubular body.

9. In a water elevator, a tubular body, a double spiral water elevating device extending the length of said body, a terminal member for the upper end of said body, a support on which said terminal member is mounted to rotate, a bearing terminal for the lower end of the body and a pivot pin secured to the lower end portion of the water elevating device, and engaging a socket in said bearing terminal, the said water elevating device being provided with scoops located in said bearing terminal.

10. In a water elevator, a tubular body, a support on which the upper part of said body is mounted to rotate, a bearing terminal for the lower end of the body having open sides and provided at its end with a bearing pin, a suspended block having a socket engaged by said bearing pin, and a spiral water elevating device held in said tubular body and provided at its lower end with a pivot pin engaging a socket in said bearing terminal.

11. In a water elevator, a suspended bearing, a tubular body, means for supporting the said tubular body from its upper portion, the said body being mounted to rotate on said supporting means and provided at its lower end with a terminal having open sides, the said terminal engaging at its lower end the said suspended bearing to prevent extreme oscillation of said tubular body, and a spiral water elevating device held in said tubular body and provided at its lower end with scoop terminals located in said terminal of the tubular body.

In testimony whereof I have signed my name to this specification in the presence of two subscribing witnesses.

ALBERT HAAS.

Witnesses:
HUGH J. CORMACK.
WHATELY T. SCROGGIE.